(12) United States Patent
Germino Ferreira Da Silva

(10) Patent No.: US 12,233,440 B2
(45) Date of Patent: Feb. 25, 2025

(54) LASER JETTER PIPE TOOL

(71) Applicant: Petróleo Brasileiro S.A.—Petrobras, Rio de Janeiro (BR)

(72) Inventor: Mario Germino Ferreira Da Silva, Rio de Janeiro (BR)

(73) Assignee: Petróleo Brasileiro S.A.—Petrobras, Rio de Janeiro (BR)

(*) Notice: Subject to any disclaimer, the term of this patent is extended or adjusted under 35 U.S.C. 154(b) by 316 days.

(21) Appl. No.: 17/907,874

(22) PCT Filed: Feb. 18, 2021

(86) PCT No.: PCT/BR2021/050074
§ 371 (c)(1),
(2) Date: Aug. 29, 2022

(87) PCT Pub. No.: WO2021/168524
PCT Pub. Date: Sep. 2, 2021

(65) Prior Publication Data
US 2023/0111551 A1 Apr. 13, 2023

(30) Foreign Application Priority Data
Feb. 27, 2020 (BR) ...................... 10 2020 003955 5

(51) Int. Cl.
*B08B 7/00* (2006.01)
*B08B 7/04* (2006.01)
(Continued)

(52) U.S. Cl.
CPC .............. *B08B 7/0042* (2013.01); *B08B 7/04* (2013.01); *B08B 9/043* (2013.01); *B08B 13/00* (2013.01);
(Continued)

(58) Field of Classification Search
None
See application file for complete search history.

(56) References Cited

U.S. PATENT DOCUMENTS 10,301,912 B2    5/2019   De Witt et al.
2005/0217855 A1  10/2005  Stave
(Continued)

FOREIGN PATENT DOCUMENTS

BR     0303473 A      10/2005
CN     203648936 U    6/2014
(Continued)

*Primary Examiner* — Rita P Adhlakha
(74) *Attorney, Agent, or Firm* — Mintz, Levin, Cohn, Ferris, Glovsky and Popeo, P.C.

(57) ABSTRACT

The present invention addresses to a laser blasting pipe for heating a scale removal treatment to be descended by electric cable, and a recirculation system with the objective of heating the scale removal solution, inside the production string during the time the reaction is taking place, in order to guarantee its efficiency. The laser blast pipe is a device similar to a metallic cylinder that can travel through the interior of a production string, being descended by gravity itself, and ascended by the action of the cable, being able to recirculate and heat the fluid. This heating would have the function of compensating the heat loss of the removal solution due to the heat exchange of the riser with the seabed, and maintaining the temperature of the reaction inside the production line in an optimal range of yield, thus aiming at increasing the reaction efficiency and the reduction of the time required for the removal of scale in the production string of the well.

7 Claims, 2 Drawing Sheets

(51) Int. Cl.
 *B08B 9/043* (2006.01)
 *B08B 13/00* (2006.01)
 *E21B 37/00* (2006.01)
 *G05D 23/19* (2006.01)

(52) U.S. Cl.
 CPC ......... *E21B 37/00* (2013.01); *G05D 23/1917* (2013.01); *B08B 2209/04* (2013.01)

(56) References Cited

U.S. PATENT DOCUMENTS

| | | |
|---|---|---|
| 2008/0047712 A1 | 2/2008 | Dyer |
| 2008/0296274 A1 | 12/2008 | Bialas et al. |
| 2009/0045176 A1 | 2/2009 | Wawers et al. |
| 2010/0044102 A1 | 2/2010 | Rinzler et al. |
| 2016/0251940 A1 | 9/2016 | De Witt et al. |

FOREIGN PATENT DOCUMENTS

| | | | |
|---|---|---|---|
| RU | 2101468 C1 | 1/1998 | |
| RU | 2169752 C2 | 6/2001 | |
| RU | 2281850 C1 | 8/2006 | |
| WO | WO-2014144887 A2 * | 9/2014 | ........... B08B 7/0042 |
| WO | 2021168524 A1 | 9/2021 | |

* cited by examiner

LASER JETTER PIPE TOOL

CROSS-REFERENCE TO RELATED APPLICATIONS

This application is a national phase application, filed under 35 U.S.C. § 371, of PCT International Patent Application No. PCT/BR2021/050074, filed Feb. 18, 2021, and claims benefit of and priority to Brazilian application BR 10 2020 003955 5, filed on Feb. 27, 2020, the disclosures of all of which are incorporated herein by reference in their entirety.

FIELD OF THE INVENTION

The present invention addresses to a laser blast pipe for heating a scale removal treatment with application in subsea equipment such as production strings, production lines, wet Christmas trees and subsea manifold, in order to improve the efficiency of the treatment reaction of scale removal.

DESCRIPTION OF THE STATE OF THE ART

The temperature of the seabed in water depths from 700 meters deep remains around 4 degrees Celsius. Subsea pieces of equipment used for the flow of oil production, such as a wet Christmas tree, production lines, manifolds, are immersed in the seabed and thus subject to these temperatures. The heat exchange of these pieces of equipment on the seabed leads to a cooling of the produced and/or injected fluids, which are transported by these pieces of equipment. Due to the distance between the satellite wells and the stationary production unit, there is a reduction in temperature that leads to the precipitation of components of the produced fluids, such as paraffins, asphaltenes and others inside the pieces of equipment of the production system. Another type of precipitate that can occur inside the subsea production pieces of equipment is the scale of barium sulfate and or strontium sulfate in sandstone formations, calcium carbonate in carbonate formations. When saline fouling occurs within the production string, a production loss due to obstructions within the production string may occur. The treatment of saline scale removal is carried out by pumping a solution of chelators that are positioned inside the scaled string, where the complexation reactions of the cations present in the salts take place, and, in this way, the scale is removed, thus unclogging the string. The efficiency of the complexation reaction depends on the temperature, and the optimal temperature range is around 80° C.; however, due to the heat exchange with the seabed, wherein the distances can reach 8 kilometers, then, when the treatment is pumped, there occurs the reduction of the temperature arriving at the string at a temperature below the ideal for the complexation reaction.

The scale removal treatment is ordinarily pumped through production and/or gas lift lines to the section of the line and/or equipment and left for a while inside the line and/or equipment, such as the production string, to occur the chelation reaction and, thus, the scale removal. However, in view of the problem of heat exchange with the seabed, during the pumping and displacement of the chelating chemical, through the gas lift line, from the production platform to the production line in the section where the scale is, there occurs the cooling of the pumped removal product, due to the heat exchange of the lines with the seabed and, thus, the yield of the scale removal reaction ends up having low efficiency depending on the temperature at which the treatment arrives at the production line in the interval of interest to be treated.

Document U.S. Pat. No. 10,301,912B2 refers to various high power laser systems for unclogging pipes and maintaining the flow. The claimed laser system is capable of delivering 20 kW of power to a long transmission cable to deliver power within the pipeline. In general, the systems, tools and methods in the document are directed towards removing, preventing, managing, cracking, cleaving, melting, altering, mitigating unwanted materials (e.g., scales, deposits, corrosion or other substances) from, over, on, or around structures (e.g., a workpiece, work area, target area, target surface, or work surface, including the interior surface). Such unwanted materials may include, by way of example, asphaltenes, rust, corrosion, corrosion by products, precipitates, waxes, degraded or old paints, calcium carbonates, barium sulfates, gas hydrates, or old coatings, paints, coatings, waxes, hydrates, microbes, paraffins, waste materials, biofilms, tars, sludges. Despite the similarities and the same purpose (fouling removal), the document does not disclose the same structure of the present invention, with modules having different functions, such as pumping, heating and recirculation.

Document US2005217855A1 discloses a method and device for removing scales, mainly from oil ducts. The removal pig is normally connected to an umbilical that extends from the surface to the scaled region. In a sealing manner, the umbilical extends axially through the pig, and the umbilical conduits terminate inside the piping at the end portion of the pig facing the hydrate plug. After the pig is moved to the fouled region, a fluid disposed with hydrate-dissolving properties, for example, a hot fluid and/or chemicals, circulates while the fluid flows back through at least another umbilical duct until the scale is removed. While this process is in progress, the tool can simultaneously advance as the scale dissolves. The pig can then be pumped back, for example, by pumping fluid through the umbilical, or it can be pulled out of the pipeline, for example via the feeder and/or the umbilical spool. By using a method and tools different from the present invention, the document is only similar in heating the place for the removal of scale.

Document RU2101468C1 discloses a device to eliminate the deposits of paraffins or bitumen that form on the inner wall of a pipeline, for example, in the tubular elements located in the center of an oil production well or in a pipeline of oil transport. Such a device, which is mounted inside the pipeline, comprises a heat generator, mechanical means for cleaning the pipeline wall, and means for moving along the pipeline. The heat generator consists of a reacting liquid, which has an exothermic decomposition reaction. This liquid is stored in a reservoir that is connected, by means of a valve, to a reactor and a decomposition chamber. The decomposition chamber is provided with nozzles, through which jets of gaseous products from the decomposition of the reacting liquid are ejected during the operation of the heat generator. These jets heat the paraffin or bitumen deposits present on the inner wall of the pipeline. In the document, despite there is disclosed a device to eliminate the deposits of paraffins or bitumen that form on the inner wall of a pipeline, this device has the disadvantage of being able to work only by stopping the circulation of hydrocarbons in the pipeline and does not mention the application of a laser.

Document US20080047712A1 discloses a process for the simultaneous removal of asphaltene and/or paraffin and other fouling from a well that are attached to these types of materials. This new process uses a unique aqueous cleaning emulsion that includes water, a detergent, a hydrocarbon solvent and an acid, such as a mineral acid, to be placed in contact with the well pipe for a period of time sufficient to decompose the asphaltenes and/or paraffins and scales. This is the only step in this operation, but it is within the scope herein with the use of a new washing tool in combination with the help of this procedure. The emulsion is injected into the oil well by using a tool that combines pressure washing and over-strength. After the emulsion has been in the well for a short period of time, the washing tool is attached to an oil well pipe line. The tool is then moved to the bottom of the well and to the surface repeatedly. As with the present invention, the document discloses the use of a tool that is introduced into the well and assists in the removal of scale with a plurality of functions, but does not have the laser heating nor the temperature sensor that optimizes the process of the invention.

As will be better detailed below, the present invention aims at solving the problems of the state of the art described above, in a practical and efficient way.

BRIEF DESCRIPTION OF THE INVENTION

The present invention addresses to a laser blast pipe for heating the scale removal treatment to be descended by electric cable, and a recirculation system with the objective of heating the scale removal solution, inside the string of production during the time the reaction is taking place, in order to guarantee the efficiency of the same. The laser blast pipe is a cylindrical tool that can travel through the interior of a production string, being descended by the cable by the gravity itself, and ascended by the action of the cable, being able to recirculate and heat the fluid. This heating would have the function of compensating the heat loss of the removal solution due to the heat exchange of the riser with the seabed, and maintaining the temperature of the reaction inside the production line in an optimal range of yield, thus aiming at increasing the reaction efficiency and the reduction of the time required for the removal of scale in the production string of the well.

OBJECTIVES

The present invention aims at providing a better efficiency of the reaction of the fouling removal treatment in subsea systems and, consequently, the removal of flow obstruction caused by fouling.

The present invention aims at carrying out the pumping of the treatment with an appropriate temperature for the efficiency of the reaction of the complexation reaction.

The present invention aims at using a device to be descended by electric cable provided with a heating system through laser, and a recirculation system with the objective of heating the scale removal solution, inside the production string during the time the reaction is taking place, in order to guarantee its efficiency, minimizing the heat loss.

These and other objectives will be achieved by the object of the present invention.

BRIEF DESCRIPTION OF DRAWINGS

The present invention will be described in more detail below, with reference to the attached figures which, in a schematic form and not limiting the inventive scope, represent examples thereof. In the drawings, there are.

DETAILED DESCRIPTION OF THE INVENTION

Preliminarily, it is highlighted that the following description will start from preferred embodiments of the invention. As will be apparent to any technician skilled on the subject, however, that the invention is not limited to these particular embodiments.

Figure 1:
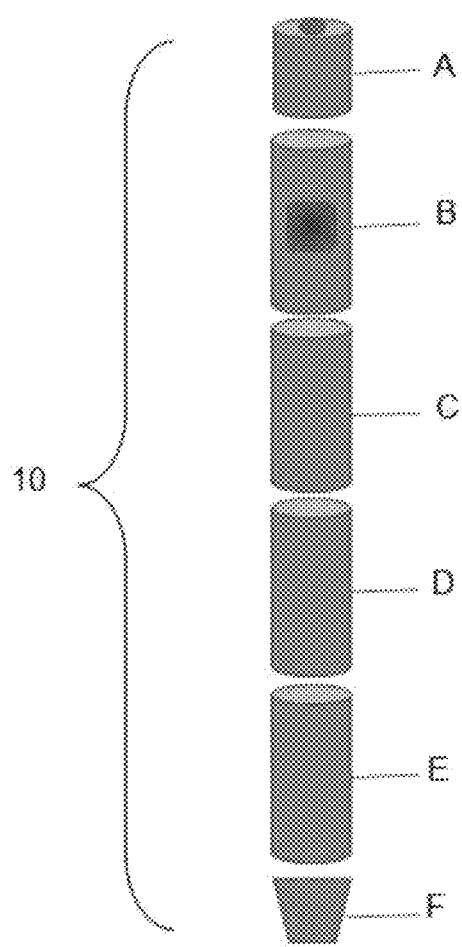
FIG. 1 schematically illustrating the laser blasting pipe tool consisting of the electrical cable connection module (A), fluid inlet module (B), pumping module (C), laser heating module (D), temperature sensor module (E) and tip for jetting fluid (F)
Figure 2:
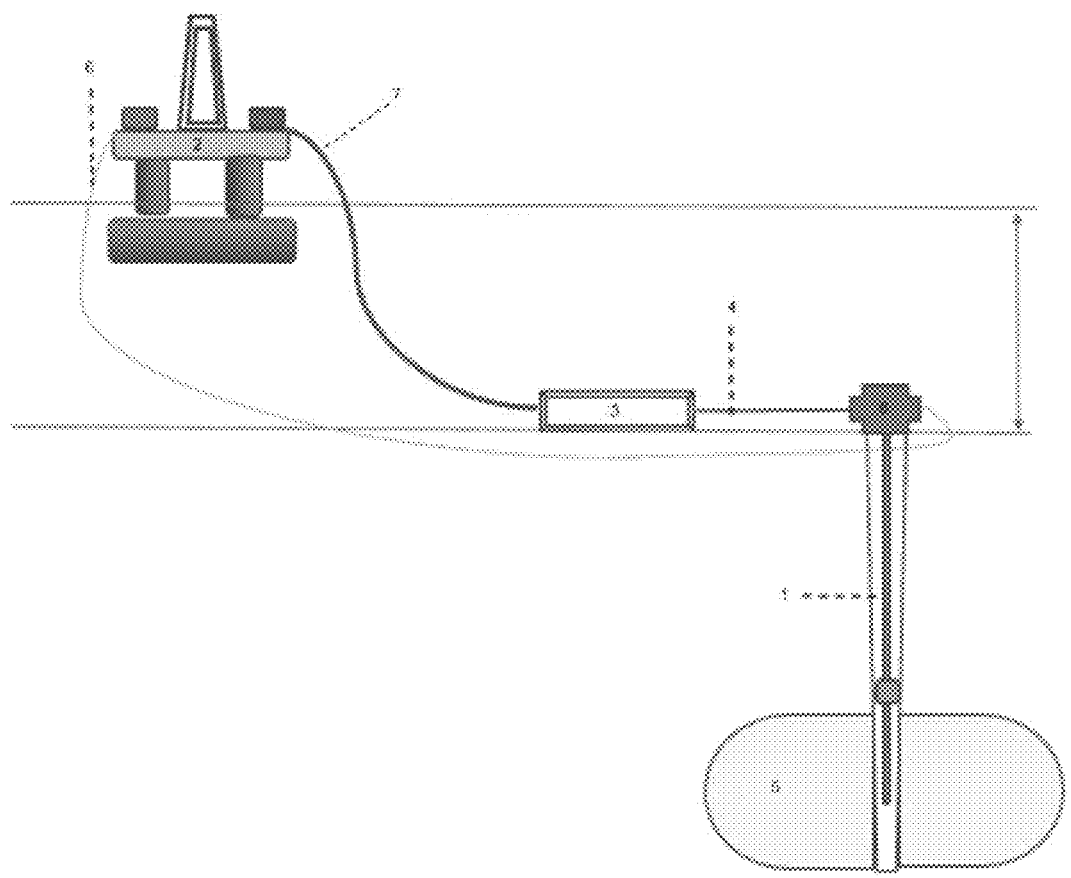
FIG. 2 illustrating a production string (1) inside the well, connected to a wet Christmas tree (8) which is connected to a manifold (3) through the production line (4), which in turn is connected to the stationary production unit through the second section of the production line (7).

The Laser Blasting Pipe (10) is a cylindrical device designed to be used initially for the purpose of cleaning the interior of production pipes such as the production string (1). Said equipment can travel through the interior of a production string (1), being descended by cable by gravity itself, and ascended by the action of the cable, being able to recirculate and heat the fluid that is around inside the production string (1), along the length of the scaled region, in order to maintain the temperature of the reaction of the chelators to remove the scale. The piece of equipment (10) consists of a modular cylindrical device, wherein the six modules are interconnected forming the laser blast pipe (10), as can be seen in the schematic view of FIG. 1, wherein the first module is the connection with an electrical cable (A) that supplies energy necessary for the operation of the laser diodes. The laser heating module (D) is provided with laser diodes that generate the laser, and fiber optic cables will be used to drive the laser from the laser diodes to the collimators, which will be used to release laser radiation into the fluid for heating the fluid through the laser blast pipe (10). The fluid inlet module (B) is where scale removal solutions can enter from the annular space between the inner wall of the production string into the tool, in order to be heated by the Laser Blast Pipe. The pumping module (C) will displace the scale removal fluid inside the tool. The temperature sensor module (E) aims at monitoring, informing and controlling the temperature of the fluid, and finally the blasting tip (F) through which the heated fluid inside the tool will be pumped back into the string in the position below the tool. The fluid flow can be directed to subsea pieces of equipment, and can be directed to operations to remove scale from production strings and/or even in squeeze operations to inhibit both sandstone and carbonate reservoirs, such as the pre-salt layer.

Several variations focusing on the protection scope of this application are allowed. Thus, there is reinforced the fact that the present invention is not limited to the particular configurations and embodiments described above.

The invention claimed is:

1. A laser blasting pipe tool comprising:
    a connection module with electrical cables at an uphole end of the laser blasting pipe tool;
    a fluid inlet module configured to allow a fluid to enter the laser blasting pipe tool;
    a pumping module down-stream of the fluid inlet module, the pumping module configured to displace the fluid through the laser blasting pipe tool;
    a laser heating module down-stream of the pumping module, the laser heating module configured to heat the fluid by releasing laser radiation into the fluid;

a temperature sensor module downstream of the laser heating module; and a blasting tip at a downhole end of the laser blasting pipe tool, the blasting tip arranged to emit the fluid heated by the laser heating module to remove scale within a production string in which the laser blasting pipe tool is located.

2. The laser blasting pipe tool according to claim 1, wherein the fluid inlet module is configured to recirculate the fluid.

3. The laser blasting pipe tool according to claim 1, wherein the temperature sensor module is configured to inform and control a temperature of the fluid.

4. The laser blasting pipe tool according to claim 1, wherein the tool is configured to descend by gravity and ascended by a cable.

5. The laser blasting pipe tool, according to claim 1, wherein the laser blasting pipe tool is cylindrical and metallic.

6. The laser blasting pipe tool according to claim 1, wherein the laser heating module comprises:
   laser diodes configured to generate the laser radiation;
   collimators arranged to release laser radiation into the fluid; and
   fiber optic cables arranged to direct the laser radiation from the laser diodes to the collimators.

7. The laser blasting pipe tool according to claim 1, wherein the fluid comprises a scale removal fluid.

* * * * *